(12) United States Patent
Kang et al.

(10) Patent No.: US 11,870,843 B2
(45) Date of Patent: Jan. 9, 2024

(54) PROCESS-LINE-CHANGEABLE PROCESS MANAGEMENT METHOD, AND SMART PROCESS SYSTEM

(71) Applicant: ULALA LAB. INC, Gyeonggi-do (KR)

(72) Inventors: Hak Ju Kang, Gyeonggi-do (KR); Hyun Soo Do, Gyeonggi-do (KR)

(73) Assignee: ULALA LAB, INC, Anyang-si (KR)

( * ) Notice: Subject to any disclaimer, the term of this patent is extended or adjusted under 35 U.S.C. 154(b) by 0 days.

(21) Appl. No.: 18/199,220

(22) Filed: May 18, 2023

(65) Prior Publication Data

US 2023/0291793 A1    Sep. 14, 2023

Related U.S. Application Data

(63) Continuation of application No. PCT/KR2021/002937, filed on Mar. 10, 2021.

(30) Foreign Application Priority Data

Dec. 14, 2020    (KR) .......................... 10-2020-0174158

(51) Int. Cl.
*H04L 29/08*      (2006.01)
*H04L 67/1008*    (2022.01)
(Continued)

(52) U.S. Cl.
CPC ...... *H04L 67/1008* (2013.01); *H04L 67/1004* (2013.01); *H04L 67/12* (2013.01); *G05B 19/4184* (2013.01); *G05B 19/41865* (2013.01)

(58) Field of Classification Search
CPC . H04L 67/1008; H04L 67/1004; H04L 67/12; G05B 19/4184; G05B 19/41865
See application file for complete search history.

(56) References Cited

U.S. PATENT DOCUMENTS

2007/0123288 A1*  5/2007  Hofbauer .......... H04M 3/42348
                                                         455/518
2021/0119902 A1*  4/2021  Iijima ................... H04L 45/121

FOREIGN PATENT DOCUMENTS

JP    H07-056838 A    3/1995
JP    2017-021840 A   1/2017
(Continued)

OTHER PUBLICATIONS

Office Action issued by Korean Intellectual Property Office in priority application KR 10-2020-0174158, dated Mar. 22, 2022, pp. 1-4.

(Continued)

*Primary Examiner* — Kim T Nguyen
(74) *Attorney, Agent, or Firm* — Dinsmore & Shohl LLP; Yongsok Choi, Esq.

(57) ABSTRACT

A smart process system includes a main server, a plurality of process servers, a worktable, and a plurality of process display terminals arranged on the worktable in order of process and connected to respective process severs. A process-line-changeable process management method includes (a) one server from among servers related to processing of the current step detects that process progress has stopped because a server different from the one server is down; (b) the one server transmits a process command signal to a different process server; and (c) the different process server provides process work information about work after stopping of the process progress to a process display terminal connected to the different process server, on the basis of the process command signal. The main server and the plurality of process servers include a process DB area assigned independently for each process.

14 Claims, 5 Drawing Sheets

(51) Int. Cl.
*H04L 67/1004* (2022.01)
*H04L 67/12* (2022.01)
*G05B 19/418* (2006.01)

(56) References Cited

FOREIGN PATENT DOCUMENTS

| | | |
|---|---|---|
| KR | 10-2005-0071975 A | 7/2005 |
| KR | 10-0775940 B1 | 11/2007 |
| KR | 10-2016-0121015 A | 10/2016 |

OTHER PUBLICATIONS

International Search Report of PCT/KR2021/002937, dated Mar. 21, 2022, pp. 1-2.

\* cited by examiner

PROCESS-LINE-CHANGEABLE PROCESS MANAGEMENT METHOD, AND SMART PROCESS SYSTEM

CROSS-REFERENCE TO RELATED APPLICATION

This application is a continuation of International Patent Application No. PCT/KR2021/002937 filed on Mar. 10, 2021 which claims priority to and the benefit of Korean Patent Application No. 10-2020-0174158 filed in the Korean Intellectual Property Office on Dec. 14, 2020, the entire contents of which are incorporated herein by reference.

BACKGROUND

The present disclosure relates to a process management method capable of changing a process line and a smart process system that performs the process management method, and more particularly, to a method and system in which a process is managed by a main server and a plurality of process servers, and even when one of the plurality of process servers related to the current process is down, the process may be replaced by another process line.

With the standardization of production and the development of a mobile process method using a conveyor system and so on, a mass production system has been rapid and standardized. That is, the work process has been subdivided, and the routine work process has been replaced with a machine, and thereby, manufacturing costs have been saved, and the quality has been increased.

In addition, in order to perform an efficient process management and improve productivity, the manufacturing field has recently introduced a number of information technologies, such as a manufacturing execution system (MES).

The information technologies may increase efficiency of production by computerizing various processes in the process and automating the production of products. In addition, the information technologies are being improved into a system that may continuously manage a changing production environment, such as ability of a worker and facility environment.

Such a technology may be defined as a smart factory in which the entire process of production in the industry is automatically performed by being connected through wireless communication. The smart factory applies information and communications technology (ICT) in which a digital automation solution is combined with the entire production managements, such as manufacturing, distribution, and logistics. In addition, Internet of things is combined with facilities and devices in a factory to collect process information in real time, and work based on this is performed, and thereby, productivity, quality, and customer satisfaction are improved.

However, the entire management of a smart factory is generally performed by a main server through a local network, and when the main server is down or an error occurs in a local network, the entire process work may be paralyzed.

In addition, when a process is managed through a public network rather than a local network, internet protocols for controlling respective devices have to be allocated, which may cause the lack of internet protocols in the network. Even when the lack of internet protocols is supplemented to some extent by using a variable internet protocols and so on, communication traffic is concentrated on a main server, and thus, frequent network errors and server overload problems may be caused.

SUMMARY

In order to solves the problems of the known art, the present disclosure provides a smart process system that may manage all processes by using a main server and share the burden of the processes by primarily collecting process state information generated during the processes through a plurality of process servers and transmitting the process state information to the main server in real time to be linked with a database corresponding to the process.

In addition, the present disclosure provides a process management method in which, even when a server related to a process currently being performed is down, a process stopped by another process server may be subsequently performed by changing a process line.

According to an aspect of the present disclosure, a smart process system includes a main server, a plurality of process servers, a worktable, and a plurality of process display terminals arranged on the worktable in order of process and respectively connected to the plurality of process servers, and the main server and the plurality of process servers each include a plurality of process DB areas independently allocated for each process.

According to another aspect of the present disclosure, a process management method that is performed by the smart process system and capable of changing a process line, includes detecting, by one server of the plurality of process serves involved in performing a current process, stop of process progress due to a server different from the one server being down, transmitting a process command signal to a another process server by the one server, and providing, by the another process server, process work information of a work after the process progress is stopped to a process display terminal connected to the another process server based on the process command signal.

According to the embodiment, the plurality of process servers may prioritize a process DB area corresponding to a preset process among the plurality of process DB areas, collect process state information generated during the process progress in the prioritized process DB area, and transmit the process state information to the main server.

According to the embodiment, the process management method may further include, before detecting of the stop of the process, receiving workpiece identification information from a workpiece sensor previously installed on the worktable by one process server of the plurality of process servers, and transmitting the workpiece identification information to the main server, transmitting, by the main server, work description information to the one process server based on the work identification information, providing, by the one process server, the work description information to a process display terminal connected to the one process server and controlling activation of a process apparatus corresponding to the work description information, and collecting, by the one process server, process state information generated based on work performed of the process apparatus in a prioritized process DB area and transmitting the process state information to the main server, wherein the work description information may include at least one of performance method information, component information, precaution information, error solution information, and process apparatus description information according to a preset work sequence for each process.

According to the embodiment, the worktable may be arranged in a form of a line and configured to move a workpiece to a position, in which a next process is performed, along the line when one work process is finished, the plurality of process display terminals and the plurality of process servers may be arranged at positions respectively corresponding to each process on the worktable, and the main server may be one of a local server and a cloud server and controlled by a manager terminal.

According to the embodiment, the providing of the process work information may include automatically moving a workpiece placed on a worktable line corresponding to the server being down to a worktable line corresponding to the another process server.

According to the embodiment, when the server being down is a first process server, the detecting of the stop of the process may include detecting, by the main server, absence of a LIVE signal periodically transmitted by the first process server for a preset time.

According to the embodiment, the transmitting of the process command signal may include transmitting, by the main server, process state information received from the first process server and work description information corresponding to a first process work together with the process command signal to a second process server, wherein the work description information may include at least one of performance method information, component information, precaution information, error solution information, and process apparatus description information according to a work sequence to be performed subsequently after the first process work is stopped.

According to the embodiment, the providing of the process work information may include providing, by the second process server, the work description information to a second process display terminal based on the process state information received from the main server to subsequently perform the first process work, canceling prioritization of a second process DB area and changing the prioritization to a first process DB area by the second process server, and collecting process state information generated during the first process work subsequently performed in the first process DB area and transmitting the process state information to the main server by the second process server.

According to the embodiment, when the server being down is the main server, the detecting of the stop of the process may include detecting absence of a transmission signal of work description information corresponding to a first process work received from the main server for a preset time by a first process server, and canceling prioritization of a first process DB area by the first process server.

According to the embodiment, work description information corresponding to all processes to be performed on the worktable may be stored in advance in the plurality of process DB areas included in the first process server, and the work description information may include at least one of performance method information, component information, precaution information, error solution information, and process apparatus description information according to a preset work sequence for each process.

According to the embodiment, the transmitting of the process command signal may include transmitting, by the first process server, a main server change signal notifying that the main server is changed to the first process server to the plurality of process servers except for the first process server, and transmitting, by the first process server, first process state information collected so far and work description information corresponding to the first process work together with the process command signal to a second process server, wherein the work description information may include at least one of performance method information, components information, precaution information, error solution information, and process apparatus description information according to a work sequence to be performed subsequently after the first process work is stopped.

According to the embodiment, the providing of the process work information may include providing, by the second process server, the work description information to a second process display terminal based on the process state information received from the first process server to subsequently perform the first process work, canceling prioritization of a second process DB area and changing the prioritization to a first process DB area by the second process server, and collecting process state information generated during the first process work subsequently performed in the first process DB area and transmitting the process state information to the first process server by the second process server.

According to the embodiment, the process management method may further include, when the main server is recovered, transmitting, by the main server, a main server recovery signal to the plurality of process servers, transmitting, by the first process server, process state information received from the plurality of process servers except for the first process server to the main server according to the main server recovery signal, prioritizing, by the first process server, the first process DB area, and updating, by the main server, information collected in the plurality of process DB areas included in the main server based on the process state information received from the first process server.

According to another aspect of the present disclosure, a smart process system, which performs a process management method capable of changing a process line, includes a main server, a plurality of process servers, a worktable, and a plurality of process display terminals arranged on the worktable in order of process and respectively connected to the plurality of process servers, wherein a process of performing the process management method capable of changing the process line include detecting, by one server of the plurality of process serves involved in performing a current process, stop of process progress due to a server different from the one server being down, transmitting a process command signal to a another process server by the one server, and providing, by the another process server, process work information of a work after the process progress is stopped to a process display terminal connected to the another process server based on the process command signal, and the main server and the plurality of process servers each include a plurality of process DB areas independently allocated for each process.

BRIEF DESCRIPTION OF THE DRAWINGS

Embodiments will be more clearly understood from the following detailed description taken in conjunction with the accompanying drawings.

DETAILED DESCRIPTION OF THE INVENTION

Hereinafter, embodiments of the present disclosure will be described in detail such that those skilled in the art to which the present disclosure belongs may easily implement the present disclosure with reference to the accompanying drawings. However, the present disclosure may be implemented in many different forms and is not limited to the embodiments to be described herein. In addition, in order to clearly describe the present disclosure with reference to the drawings, portions irrelevant to the description are omitted, and similar reference numerals are attached to similar portions throughout the specification.

Throughout the present specification, when a portion is described to be "connected" to another portion, this includes not only a case where the portion is "directly connected" thereto, but also a case where the portion is "electrically connected" thereto with another element therebetween. In addition, when a certain portion is described to "include" a certain component, this means that the certain portion may further include other components without excluding other components unless otherwise stated.

A "terminal" to be described below may be implemented by a computer or a portable terminal capable of accessing a server or another terminal through a network. Here, the computer may include, for example, a notebook computer in which a web browser is stored, a desktop computer, a laptop computer, a virtual reality head mounted display VR HMD (for example, HTC VIVE, Oculus Rift, GearVR, DayDream, PSVR, and so on), and so on. Here, the VR HMD includes a VR HMD for a personal computer (PC) (for example, HTC VIVE, Oculus Rift, FOVE, Deepon, or so on) and VR HMD for mobile terminal (for example, GearVR, DayDream, Stormtrooper, Google Cardboard, or so on), a standalone model that are independently implemented of VR HMD for console (PSVR) (for example, Deepon, PICO, or so on), and so on The portable terminal is, for example, a wireless communication device that ensures portability and mobility, and includes not only a smartphone, a tablet PC, and a wearable device, but also various devices equipped with communication modules, such as a Bluetooth (Bluetooth low energy (BLE)) module, a near field communication (NFC) module, a radio frequency identification (RFID) module, and an ultrasonic module, an infrared module, a Wi-Fi module, and a LiFi module. In addition, the "network" refers to a connection structure capable of exchanging information between nodes, such as a terminal and a server and includes a local area network (LAN), a wide area network (WAN), the Internet (WWW: World Wide Web), a wired and wireless data communications network, a telephone network, a wired and wireless television communication network, and so on. For example, the wireless data communication network includes third generation (3G), fourth generation (4G), fifth generation (5G), third generation partnership project (3GPP), long term evolution (LTE), world interoperability for microwave access (WIMAX), Wi-Fi, Bluetooth communication, infrared communication, ultrasonic communication, visible light communication (VLC), LiFi, and so on but are not limited thereto.

Hereinafter, embodiments of the present disclosure are described in detail with reference to the accompanying drawings.

Figure 1:
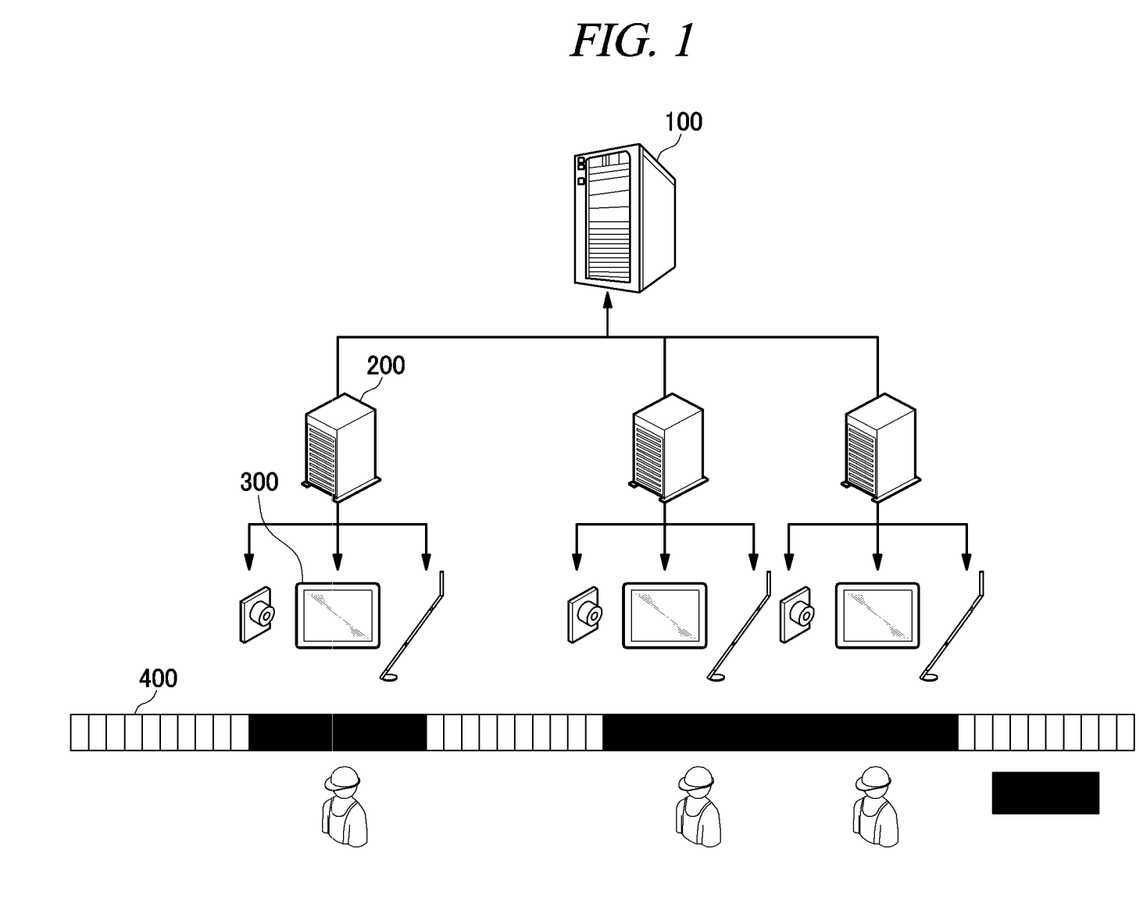
FIG. 1 is a structural diagram of a smart process system according to an embodiment of the present disclosure.

FIG. 1 is a structural diagram of a smart process system according to an embodiment of the present disclosure.

Referring to FIG. 1, the smart process system includes a main server 100, a plurality of process servers 200, a worktable 400, and a plurality of process display terminals 300 arranged on the worktable 400 in order of process, and the plurality of process display terminals 300 are connected to the plurality of process servers 200.

First, according to an embodiment of the present disclosure, the main server 100 may be a local server or a cloud server. In the local server, a self-computer may be arranged in one area of a process site to configure a server environment. Preferably, the local server may be arranged and connected to an area near a manager terminal that controls all of a manufacturing site. A computer constituting a server environment may assign a virtual IP to the local server (=the main server), and may assign separate identification IPs to each of the plurality of process servers 200, the worktable 400, and other components arranged on the worktable by changing a port number at the rear of the virtual IP. Therefore, a plurality of pieces of information and signals in the process between each server and components may be transmitted and received through the identification IPs.

When the work of the process is complex, when many process steps are configured, or when many production sites need to be managed, it is advantageous to build the main server 100 as the cloud server. For example, a company that operates multiple factories may be representatively selected. In this case, it may be preferable to adopt a private cloud server format. That is, a company hosts, manages, and maintains the server itself to operate stably, information in the server is not shared with other users to increase security, and by providing a network with an internal intranet, a virtual private network (VPN), and so on in the company, IPs that may identify each server and component may be assigned without any burden.

Also, the server is not limited to the server type described above, and a local server and a cloud server may be used in combination, or a general public server may be used depending on a process scale and consumer characteristics. However, regardless of the server type, a manager receives various types of information on a process, production, and so on from the main server 100 through a manager terminal, and controls the main server 100 through a preset interface to perform efficient and systematic management.

According to an embodiment of the present disclosure, the main server 100 may manage the overall process work through exchange with the plurality of process servers 200. For example, the main server 100 may receive various types of information generated in a process from the process server 200, and issue a work order or a stop signal to the plurality of process servers 200 or transmit work description information based thereon. In addition, the main server 100 may receive a LIVE signal of the process server 200 repeated during a preset period and determine whether the process server 200 is down. In addition, the main server 100 may be used in various fields, such as process management, production management, performance management, quality management, distribution management, worker management, and worktable management.

According to an embodiment of the present disclosure, the plurality of process servers 200 may be arranged at positions corresponding to respective processes on the worktable 400. For example, as described above, based on the IP corresponding to the local server or the cloud server (=the main server), each of the process servers 200 may be configured by a preset computer to which a unique identification IP is assigned. Here, the positions corresponding to the respective processes may indicate functional positions, not physical positions.

Figure 2:
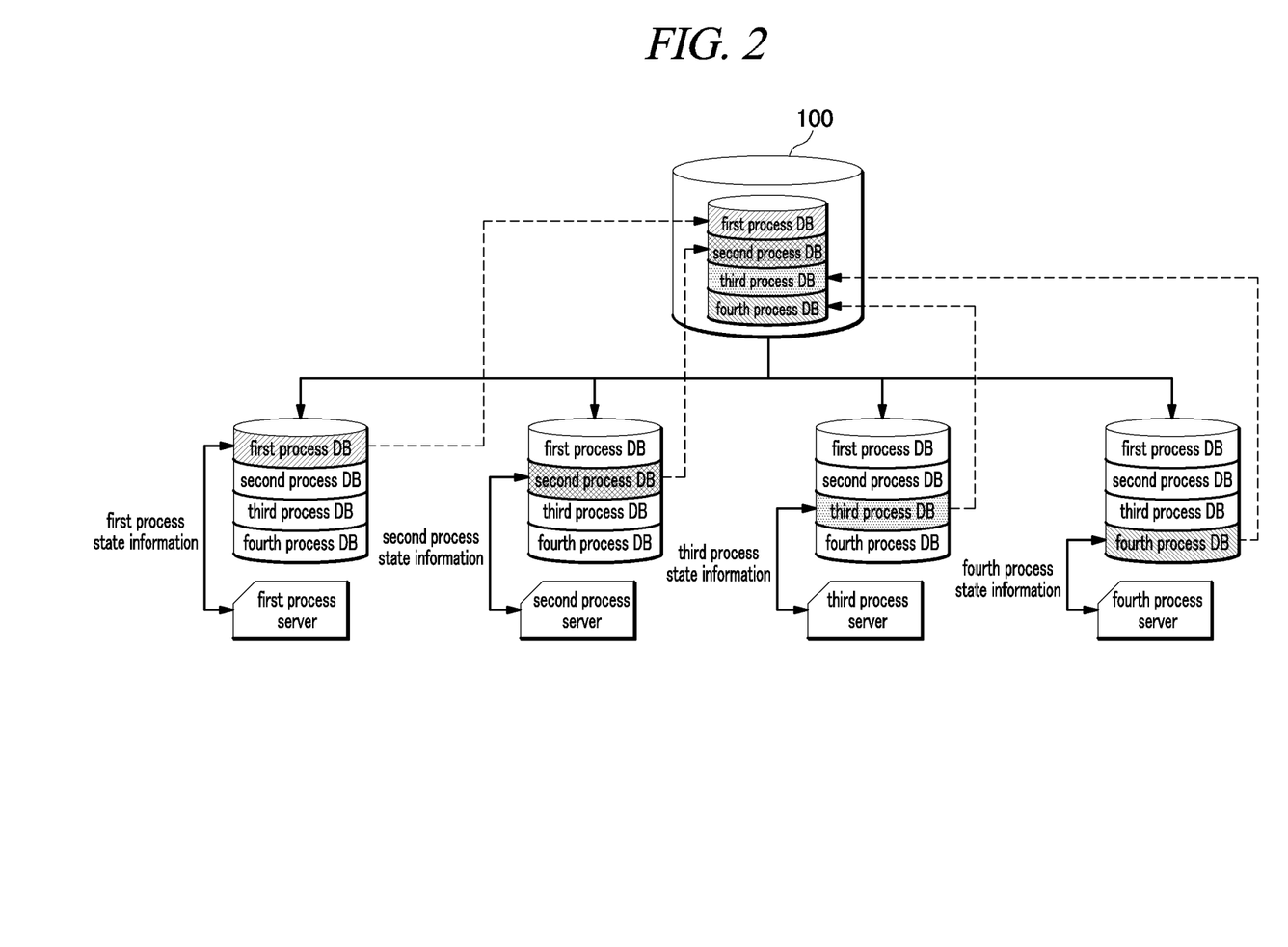
FIG. 2 is an example diagram illustrating a main server and a plurality of process servers according to an embodiment of the present disclosure.

In addition, according to an embodiment of the present disclosure, the main server 100 and the plurality of process servers 200 may each include a process DB area independently allocated for each process. Referring to FIG. 2, each process includes four steps, and the plurality of process servers 200 are provided to correspond to respective processes. Here, the plurality of process servers 200 may each prioritize a process DB area corresponding to a preset process among the process DB areas. Thereafter, the plurality of process servers 200 may collect process state information generated during the process in a prioritized process DB area and transmit the process state information to the main server 100 in real time. As illustrated in FIG. 2, the transmitted process state information may be stored in a process DB corresponding to a corresponding process in the main server 100, and the main server 100 transmits work description information based thereon to the process server 200. In addition, the main server 100 provides the received process state information to a manager terminal, and accordingly, a manager may check a progress status of the process in real time.

For example, referring to FIG. 2, a first process server includes a first process DB area to a fourth process DB area, and the first process DB area is prioritized first. Thereafter, when a work A of the first process is completed, work-A completion state information is stored in a first process DB and transmitted to the main server 100, and based on this, the main server 100 updates the first process DB included in the main server 100 and provides the work-A completion state information to the manager terminal. Accordingly, the manager may recognize completion of the work A.

Referring again to FIG. 1, the process display terminal 300 connected to the process server 200 may be arranged in a position corresponding to each process on the worktable 400. The process display terminal 300 may generally have a fixed display but may be a mobile terminal, such as a tablet PC, or a wearable device, such as smart glasses, depending on the type, characteristics, and difficulty of a work.

In addition, each process may include a single or multiple workpiece sensors and a single or multiple process apparatuses related to the process. These components may also be connected to the process server 200 to transmit to and receive from a signal or control functions thereof.

According to one embodiment of the present disclosure, the worktable 400 may be arranged in a line shape, and when one work process is finished, the worktable 400 may be configured such that a workpiece may be moved to a position to perform the next process along the line. For example, the worktable 400 may be formed in the form of a conveyor belt, and since this may also be assigned an identification IP, the worktable 400 may receive a preset signal from each server to automatically move the workpiece to another line when a process is completed or a special event occurs.

Hereinafter, a process management step of a smart process system according to an embodiment of the present disclosure is described with reference to FIG. 3.

Figure 3:
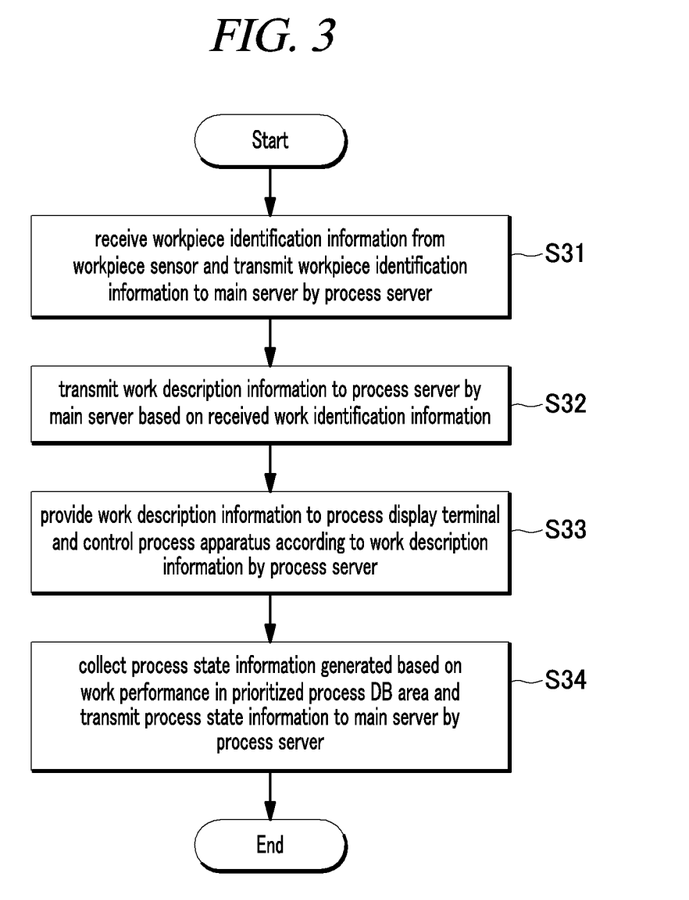
FIG. 3 is a flowchart of a process management step according to an embodiment of the present disclosure.

FIG. 3 is a flowchart of a process management step according to an embodiment of the present disclosure.

In step S31, the process server 200 may receive workpiece identification information from a workpiece sensor installed on the worktable 400 and transmit the workpiece identification information to the main server 100. Here, a method of identifying a workpiece, such as scanning a code preset in the workpiece by using the workpiece sensor or capturing an image of the workpiece, is not limited by formats.

In step S32, the main server 100 may transmit work description information to the process server 200 based on the received work identification information. For example, when the work sensor identifies and transmits a workpiece K, the main server 100 extracts the work description information on the workpiece K and transmits description information on the first work in a process for the workpiece K to the process server 200. Here, the work description information may include at least one of performance method information, component information, precautions information, error solution information, and process apparatus description information according to a preset work sequence for each process, and the main server 100) may combine the pieces of information according to the process progress state and transmit the combined information to the process server 200.

In step S33, the process server 200 may provide the received work description information to the process display terminal 300 connected thereto. For example, the performance method information, the component information, the precaution information, and the process apparatus description information for the first work of the workpiece K may be configured on a screen of the process display terminal 300. Specifically, for example, information indicating that two m bolts and two n nuts are required may be displayed on the screen, and a phrase "fasten one m bolt and one n nut to a designated first hole" may be output. In addition, information, such as a length, a rotational speed, an angle, and so on of a process apparatus that performs the process, and information on precautions for use may be output together, and an image of a work being performed may be additionally provided. Therefore, even when a worker is not skilled, the work may be easily performed based on the information displayed on the screen.

In step S33, the process server 200 may control activation of the process apparatus corresponding to the received work description information. According to an embodiment of the present disclosure, a plurality of process apparatuses may be arranged in the worktable 400, and some or all of the process apparatuses may perform various functions. Accordingly, the process server 200 may transmit a command signal for activating the work and function of the process apparatus to a corresponding process apparatus based on the work description information, and the process apparatus may receive the command signal and output a preset display such as lighting, or may induce the use of a worker by directly performing the function.

In step S34, the process server 200 may collect the process state information generated based on the work performance of the process apparatus in a prioritized process DB area and transmit the process state information to the main server 100. Referring to the example described above, when a worker completes fastening the m nut and the n nut to the designated first hole through the process apparatus, completion information of the corresponding work is collected in the process DB area, and then transmitted to the main server 100 in real time. Thereafter, the main server 100 starts to provide the process server 200 with description information on a second work of the workpiece K and repeatedly performs step S32 to step S34 until all of the works in the process are completed. When a malfunction or an error occurs, the main server 100 receives process state information corresponding thereto from the process server 200 and transmits the work description information including error solution information to suggest a solution to a work.

In this way, according to an embodiment of the present disclosure, by distributing the processing and communication traffic concentrated on the main server, a stable network state may be maintained to reduce overloading of the main server, and also, high processing speed and data loss prevention may be achieved. In other words, when identifying various components provided in various processes and directly exchanging information and signals with the various components, a vast amount of data and processes may be generated, which may cause communication confusion, resulting in frequent errors and downtime, however, embodiments of the present disclosure may solve this problem.

Hereinafter, a process line method capable of changing a process line performed by a smart process system, according to an embodiment of the present disclosure, is described.

First, any one of the servers involved in performing a process of the current step may detect that the process is stopped because another server other than the one server is down. That is, any one of the main server 100 and the process servers 200 related to the current process step may detect that another server is down.

Thereafter, any one server detecting a down state may transmit a process command signal to another process server. Here, another process server is the process server of the next step in general, but, depending on the type and characteristics of the process, the type of an arranged process apparatus, the proficiency of a worker, and the state of the process server in the next step, when the process may be performed in any order, the process server in the previous step may be selected to perform an optimized process.

Next, another process server receiving the process command signal may provide process work information of a work to the process display terminal 300 connected thereto after the process progress is stopped based on the process command signal. For example, when receiving the process command signal, the process display terminal 300 connected to the process server may then output a standby screen showing that a work may be performed and may also output process state information collected in the stopped process. After the corresponding work arrives, the process display terminal 300 may receive and output the work description information according to the work sequence after the stop. That is, the next step in the stopped process may be continuously performed on a worktable where the process server receiving the process command signal is provided, and thus, there is no significant disruption to production volume and production speed, and sufficient time to recover a server being down may be ensured.

Hereinafter, embodiments of a process management method capable of changing a process line are described with reference to FIGS. 4 and 5.

Figure 4:
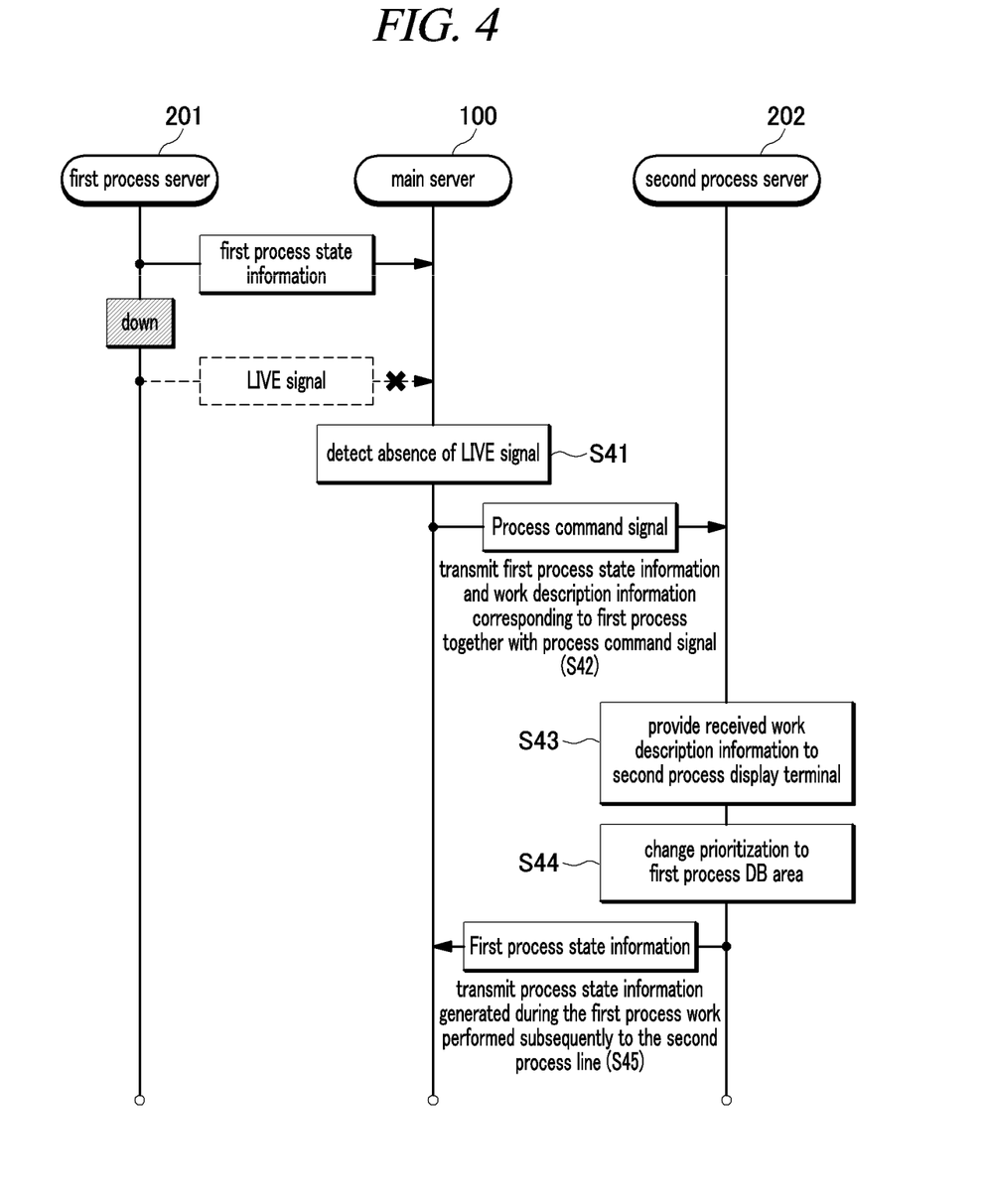
FIG. 4 is a flowchart illustrating a first embodiment of a process management method capable of changing a process line, according to the present disclosure.

FIG. 4 is a flowchart illustrating a first embodiment of the process management method capable of changing the process line, according to the present disclosure.

The first embodiment relates to a method of continuously performing a stopped process by moving a workpiece to another process line when a process server corresponding to a corresponding process is down while the process is in progress. Hereinafter, a first process server 201 refers to a process server that performs a current process step, and a second process server 202 refers to a process server that subsequently performs the process.

First, the plurality of process servers 200 according to an embodiment of the present disclosure may periodically transmit a LIVE signal to the main server 100. Accordingly, in step S41, the main server 100 detects absence of the LVE signal of the first process server 201 for a preset time, determines a down state of the first process server, and determines that a first process is stopped. In addition, the first process state information is continuously transmitted to the main server 100 from the first process server 201 according to the progress of the process, and accordingly, even when no transmission of the first process state information is detected for the preset time, the main server 100 may determine whether the first process server 201 is down. Here, it is preferable that a cycle of the LIVE signal is set to be somewhat different from an average time based on an average of the time when the work in the process is completed, such that there is no hasty determination of the down state of the process server 200.

In step S42, the main server 100 may transmit a process command signal according to the first process server 201 being down to the second process server 202. In this case, the process state information received from the first process server 201 and work description information corresponding to the first process work may also be transmitted. For example, when the first process server 201 is down while work k is performed in the first process, the main server 100 may transmit the first process state information received before the work k is performed and work description information corresponding to the work k to the second process server 202. Thereafter, the work description information may include at least one of performance method information, component information, precaution information, error solution information, and process apparatus description information according to a work sequence of the first process to be performed subsequently.

In step S43, the second process server 202 may provide work description information to a second process display terminal based on the received process state information. Details thereof are replaced with the description of step S33 described above. Accordingly, a worker on the worktable 400 where the second process server 202 is placed may easily continue to perform the first process even when the worker is not familiar with the first process.

In step S44, the second process server 202 may cancel prioritization of the previously set second process DB area and change the second process DB area to the first process DB area. In addition, in step S45, the second process server 202 may collect the generated during the subsequently performed first process work in the first process DB area and transmit the second process DB area to the main server 100. That is, as described above, the first process DB area is also set in advance, and accordingly, the second process server 202 collects the information on the first process to be performed subsequently in the first process DB area rather than the second process DB area. Because the information is transmitted to the first process DB area in the main server 100 in real time, a manager may accurately check a progress state of the first process through a manager terminal even when the first process is stopped. For example, when the work K of the first process is completed on the worktable 400 where the second process server 202 is placed, the manager terminal may output the work-k completion state information to a first process worktable rather than a second process worktable.

As an additional embodiment, the first process server 201 performs self-inspection for each task based on the performance of the process equipment and transmits self-inspection result information to the first process display terminal and the main server 100.) may be transmitted. As a result of the frequent inspection, when it is determined that there is an error in the performed work, the first process server 201 may transmit error information to the main server 100, receive error solution information corresponding thereto, and provide the error information and the error solution information to the first process display terminal. Thereafter, the main server 100 may determine whether the first process may proceed based on the received error information. For example, when it is determined that the worktable 400 has a fatal error that may not be immediately dealt with, step S42 to step S45 described above may be performed.

In an additional embodiment similar thereto, the first process server 201 may identify a case where a function of a process apparatus is not activated or malfunctions, and in this case, the first process server 201 may transmit an apparatus error signal and process apparatus information to the main server 100. Thereafter, the main server 100 may determine whether the first process may proceed, and when it is determined that the first process may not proceed, the step S42 to step S45 described above may be performed. That is, when the first process server 201 is no longer process the work at the first process worktable because a special event occurs in a state where the first process server 201 is not down, the second process server 202 continuously performs the first process work, and accordingly, rapid action may be taken without reducing production and a production speed.

In an additional embodiment, each of the plurality of process servers 200 periodically transmits the LIVE signal to the main server 100, and accordingly, the main server 100 may detect that another process server other than the first process server 201 is down. For example, when the first process is in progress and the second process server 202 corresponding to the next process is down, the main server 100 may transmit a process command signal and work description information related to the second process to the first process server 201 after the first process is completed, and accordingly, the second process may be performed immediately on the first process worktable after the first process. Accordingly, in this case, the first process server 201 may change prioritization to the second process DB area.

Figure 5:
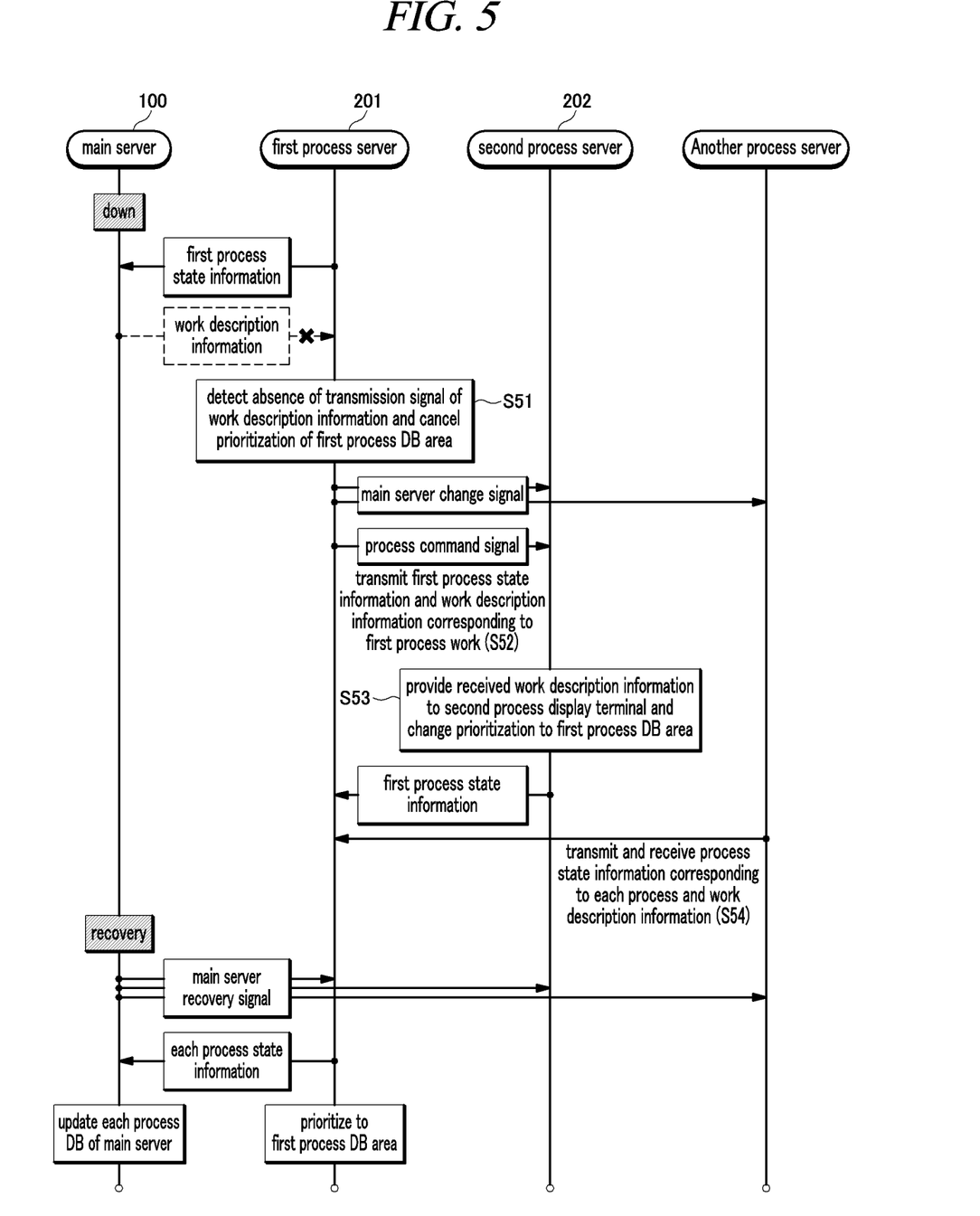
FIG. 5 is a flowchart illustrating a second embodiment of a process management method capable of changing a process line, according to the present disclosure.

FIG. 5 is a flowchart illustrating a second embodiment of a process management method capable of changing a process line, according to the present disclosure.

The second embodiment relates to a method in which, when the main server 100 is down during the process, the first process server 201 replaces the main server 100 to proceed the process without interruption.

In addition, work description information corresponding to all processes to be performed in the entire worktable 400 may be stored in advance in the plurality of process DB areas included in the first process server 201. For example, when the entire process includes a first process to a fourth process, a first process work description information to a fourth process work description information may be received in advance from the main server 100 and respectively stored in the first process DB area to the fourth process DB area in the first process server 201. That is, according to one embodiment of the present disclosure, the main server 100 may be down to a minimum according to the stability of a network, and even when the main server 100 is down, data may be backed up to prevent the main server 100 from being down. This may be applied not only to the first process server 201 but also to all process servers.

Referring to FIG. 5, process state information and work description information are continuously exchanged during the process as described above, and in step S51, the first process server 201 may detect a down state of the main server 100 by detecting absence of a transmission signal of the work description information corresponding to the process state information currently transmitted from the main server 100 for a preset time. When it is determined that the main server 100 is down, the first process server 201 may cancel the prioritization of the first process DB area and may change to an entire process DB area mode to receive the process state information from each of other process servers.

Thereafter, in step S52, the first process server 201 may transmit a main server change signal to all other process servers excluding the first process server 201 to notify that the main server is changed. In addition, the first process state information and work description information corresponding to the first process work collected up to now in the first process in progress may be transmitted to the second process server 202 together with a process command signal. Also, the work description information transmitted to the second process server 202 may include at least one of performance method information, component information, precaution information, error solution information, and process apparatus description information according to a work sequence of the first process to be performed subsequently.

In step S53, the second process server 202 may provide the received work description information to the second process display terminal, cancel the prioritization of the second process DB area, and then changes the prioritization to the first process DB area. In addition, the first process state information generated during the first process work to be performed subsequently may be collected in the first process DB area and transmitted to the first process server. That is, contents related to this are the same as in the first embodiment, but the only difference is that information is exchanged with the first process server 201 instead of the main server 100.

In step S54, after the first process and the second process are completed in the second process table, the first process server 201 may receive process state information from the process servers according to the subsequent process and transmit the work description information. That is, in all processes performed before the main server 100 is recovered, the first process server 201 replaces the role of the main server 100, thereby solving a problem of production interruption.

In addition, when the main server 100 is recovered, the main server 100 may transmit a main server recovery signal to all of the plurality of process servers 200 to notify that the main server 100 is recovered. After receiving the notification, the first process server 201 may transmit process state information received from the plurality of process servers other than the first process server to the main server 100 until the main server 100 is recovered after being down. Thereafter, the first process server 201 may prioritize the first process DB area again to prepare a process of the next workpiece. The main server 100 may update previously collected data in each process DB area included in the main server 100 based on each process state information received from the first process server 201. That is, when the main server 100 is recovered, a manager may accurately receive a result of the process performed before the recovery after being down through a manager terminal for each process regardless of whether or not the main server 100 is down.

In an additional embodiment, when the main server 100 is down, other process servers other than the first process server 201 may also perform a function of the main server 100. In this case, the first process server 201 may manage the first process by exchanging information with the replaced process server, and a process corresponding to the replaced process server may be performed in a third process line according to the process management method of the present disclosure which may change a process line. Also, when the main server 100 is recovered after the corresponding process is directly managed by the replaced process server, process state information including information on the recovery may be transmitted to the main server 100.

In this way, in the known art, when the main server is down, all processes are stopped until the main server is recovered, or reception of information on the processes is delayed, which causes enormous damage to a production volume and a production speed, but the process management method of the present disclosure which may change a process line may solve this problem and may sufficiently obtain a recovery time of the main server 100 without production abnormality.

Although the method and system of the present disclosure are described in relation to specific embodiments, and some or all of components or operations thereof may be implemented by using a computer system having a general-purpose hardware architecture.

In a smart process system according to an embodiment of the present disclosure, process servers are built for each process line to manage the processes, and thus, throughput and communication concentrated on a main server may be distributed to maintain a stable network.

In addition, according to an embodiment of the present disclosure, the main server and each process server may include a process DB area independently allocated for each process to collect information generated during process work in the DB area of the process in the process server and to transmit the information to the DB area of the process in the main server in real time, and accordingly, process management of the main server may be performed organically and integrally.

In addition, according to an embodiment of the present disclosure, network overload does not occur, and accordingly, a down phenomenon of each server may be reduced. In particular, process burden of a main server is significantly reduced, and accordingly, it is possible to prevent an overall management for processes, production, and performance management from being disrupted. In addition, even when one process server is down, the entire manufacturing process does not stop, and a quick action may be taken by recovering only the corresponding process server.

Furthermore, in a process management method capable of changing a process line according to an embodiment of the present disclosure, even before the process server is recovered, work may be performed by other process servers, and thus, a production speed and production may be maintained. Furthermore, even when the main server is down, any one process server may perform a function of the main server, and thus, wasted time and cost may be reduced to a minimum, and work time for recovering the main server may be sufficiently ensured.

The above description of the present disclosure is for illustrative purposes, and those skilled in the art to which the present disclosure belongs will understand that embodiments of the present disclosure may be easily modified into other specific forms without changing the technical idea or essential features of the present disclosure. Therefore, the embodiments described above should be understood as illustrative in all respects and not limiting. For example, each component described as a single type may be implemented in a distributed manner, and similarly, components described as distributed may be implemented in a combined form.

The scope of the present disclosure is indicated by claims to be described below rather than the detailed description above, and all changes or modifications derived from the meaning and scope of the claims and equivalent concepts thereof should be interpreted as being included in the scope of the present disclosure.

What is claimed is:

1. A process management method that is performed by a smart process system including a main server, a plurality of process servers, a worktable, and a plurality of process display terminals arranged on the worktable in order of process and respectively connected to the plurality of process servers and is capable of changing a process line, the process management method comprising:
   (a) detecting, by one server of the plurality of process servers involved in performing a current process, stop of process progress due to a server different from the one server being down;
   (b) transmitting a process command signal to a another process server by the one server; and
   (c) providing, by the another process server, process work information of a work after the process progress is stopped to a process display terminal connected to the another process server based on the process command signal,
   wherein the main server and the plurality of process servers each include a plurality of process DB areas independently allocated for each process.

2. The process management method of claim 1, wherein the plurality of process servers prioritize a process DB area corresponding to a preset process among the plurality of process DB areas, collect process state information generated during the process progress in the prioritized process DB area, and transmit the process state information to the main server.

3. The process management method of claim 1, further comprising:
   before the process (a),
   receiving workpiece identification information from a workpiece sensor previously installed on the worktable by one process server of the plurality of process servers, and transmitting the workpiece identification information to the main server;
   transmitting, by the main server, work description information to the one process server based on the work identification information;
   providing, by the one process server, the work description information to a process display terminal connected to the one process server and controlling activation of a process apparatus corresponding to the work description information; and
   collecting, by the one process server, process state information generated based on work performed of the process apparatus in a prioritized process DB area and transmitting the process state information to the main server,
   wherein the work description information includes at least one of performance method information, component information, precaution information, error solution information, and process apparatus description information according to a preset work sequence for each process.

4. The process management method of claim 1, wherein the worktable is arranged in a form of a line and configured to move a workpiece to a position, in which a next process is performed, along the line when one work process is finished,
the plurality of process display terminals and the plurality of process servers are arranged at positions respectively corresponding to each process on the worktable, and
the main server is one of a local server and a cloud server and controlled by a manager terminal.

5. The process management method of claim 4, wherein, in the process (c),
automatically moving a workpiece placed on a worktable line corresponding to the server being down to a worktable line corresponding to the another process server.

6. The process management method of claim 1, wherein, in the process (a), when the server being down is a first process server, detecting, by the main server, absence of a LIVE signal periodically transmitted by the first process server for a preset time.

7. The process management method of claim 6, wherein, in the process (b),
transmitting, by the main server, process state information received from the first process server and work description information corresponding to a first process work together with the process command signal to a second process server, and
the work description information includes at least one of performance method information, component information, precaution information, error solution information, and process apparatus description information according to a work sequence to be performed subsequently after the first process work is stopped.

8. The process management method of claim 7, wherein, in the process (c),
providing, by the second process server, the work description information to a second process display terminal based on the process state information received from the main server to subsequently perform the first process work;
canceling prioritization of a second process DB area and changing the prioritization to a first process DB area by the second process server; and
collecting process state information generated during the first process work subsequently performed in the first process DB area and transmitting the process state information to the main server by the second process server.

9. The process management method of claim 1, wherein, in the process (a),
when the server being down is the main server, detecting absence of a transmission signal of work description information corresponding to a first process work received from the main server for a preset time by a first process server; and
canceling prioritization of a first process DB area by the first process server.

10. The process management method of claim 9, wherein work description information corresponding to all processes to be performed on the worktable is stored in advance in the plurality of process DB areas included in the first process server, and
the work description information includes at least one of performance method information, component information, precaution information, error solution information, and process apparatus description information according to a preset work sequence for each process.

11. The process management method of claim 9, wherein, in the process (b),
transmitting, by the first process server, a main server change signal notifying that the main server is changed to the first process server to the plurality of process servers except for the first process server, and
transmitting, by the first process server, first process state information collected so far and work description information corresponding to the first process work together with the process command signal to a second process server,
the work description information includes at least one of performance method information, components information, precaution information, error solution information, and process apparatus description information according to a work sequence to be performed subsequently after the first process work is stopped.

12. The process management method of claim 11, wherein, in the process (c),
providing, by the second process server, the work description information to a second process display terminal based on the process state information received from the first process server to subsequently perform the first process work;
canceling prioritization of a second process DB area and changing the prioritization to a first process DB area by the second process server; and
collecting process state information generated during the first process work subsequently performed in the first process DB area and transmitting the process state information to the first process server by the second process server.

13. The process management method of claim 9, further comprising:
when the main server is recovered,
transmitting, by the main server, a main server recovery signal to the plurality of process servers;
transmitting, by the first process server, process state information received from the plurality of process servers except for the first process server to the main server according to the main server recovery signal;
prioritizing, by the first process server, the first process DB area; and
updating, by the main server, information collected in the plurality of process DB areas included in the main server based on the process state information received from the first process server.

14. A smart process system that performs a process management method capable of changing a process line, the smart process system comprising:
a main server;
a plurality of process servers;
a worktable; and
a plurality of process display terminals arranged on the worktable in order of process and respectively connected to the plurality of process servers;
wherein a process of performing the process management method capable of changing the process line comprises detecting, by one server of the plurality of process serves involved in performing a current process, stop of process progress due to a server different from the one server being down, transmitting a process command signal to a another process server by the one server, and providing, by the another process server, process work information of a work after the process progress is stopped to a process display terminal connected to the another process server based on the process command signal, and the main server and the plurality of process servers each include a plurality of process DB areas independently allocated for each process.

\* \* \* \* \*